Figure 1:
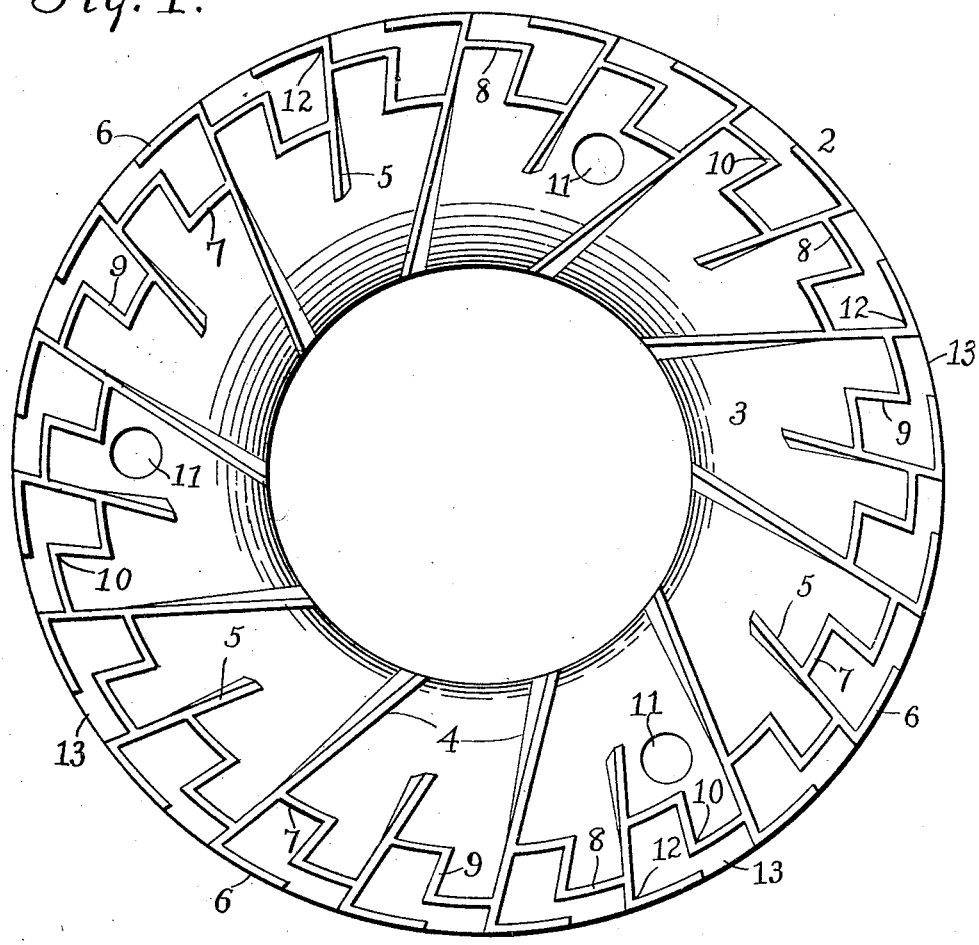

B. A. SHAW.
GRINDING PLATE FOR FEED MILLS.
APPLICATION FILED JUNE 21, 1920.

1,361,915.

Patented Dec. 14, 1920.

Inventor
Byron A. Shaw
By his Attorney R. Champion

UNITED STATES PATENT OFFICE.

BYRON A. SHAW, OF BRADFORD, NEW YORK.

GRINDING-PLATE FOR FEED-MILLS.

1,361,915.  Specification of Letters Patent.  Patented Dec. 14, 1920.

Application filed June 21, 1920. Serial No. 390,347.

*To all whom it may concern:*

Be it known that I, BYRON A. SHAW, a citizen of the United States, and a resident of Bradford, in the county of Steuben and State of New York, have invented certain new and useful Improvements in Grinding-Plates for Feed-Mills, of which the following is a specification.

This invention relates to a grinding plate for feed mills, and the main object of the invention is to provide a plate which will grind grain, etc., more thoroughly and speedily than the plates now in use, the present invention being an improvement on the device of Patent No. 1,306,468, granted June 10th, 1919, to the present applicant and George J. Covert jointly.

The main feature which distinguishes the present invention from the device of the patent before mentioned is the arrangement of the grinding and deflecting ribs carried by the grinding teeth, which latter are substantially the same as in the patent aforesaid, but a grinding rib of one tooth and a deflecting rib of an adjoining tooth are in the present construction connected by a shearing rib to close the space between said teeth. This arrangement of an additional shearing connector with its shearing pocket being preserved in all the spaces between the different pairs of teeth the result is the formation of a continuous zigzag retaining rim some distance within the circumference of the plate, and the pockets and shearing angles thus formed add greatly to the speed and effectiveness of the grinding action. After the ground grain, etc., has passed beyond this zigzag retaining portion of the grinding surface it is again subjected to a final grinding at the shearing pockets between the zigzag retainer and the outer retaining ribs before being ejected, completely ground. As in the before mentioned patented device the ribs attached to the grinding teeth are approximately parallel with the rim of the plate, and the plate is self-sharpening.

The employment of a connecting rib approximately parallel with and between each pair of main teeth and connecting the ribs projecting from said teeth, provides an additional shearing pocket between each pair of grinding teeth, greatly increasing the thoroughness of grinding.

Another important feature is the provision of grinding members of comparatively slight face area but of relatively great depth, this construction permitting fine grinding and allowing many re-sharpenings of the plate to renew the same. Plates hitherto in commercial use and having narrow-faced teeth have formed such teeth of slight depth, this being considered necessary in order to prevent packing of material and also to permit fine grinding. Such a plate was easily injured, and was on account of the shallowness of its cutting parts not adapted for effective or frequent re-grindings. The present plate, while having comparatively narrow faced teeth in its preferred form, has such teeth set out from the body of the plate many times as far as in many plates in general use, this permitting many re-sharpenings before the plate is discarded.

Figure 2:
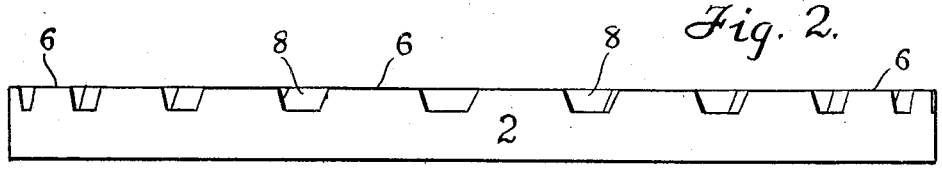

These and other features of the invention not hereinbefore referred to will be hereinafter described and claimed and are illustrated in the accompanying drawing, in which, Figure 1 is a face view of my improved plate, and Fig. 2 is an edge view of the same.

Referring to the drawings, 2 designates generally the grinding plate of my invention, said plate being adapted for coöperation with a complementary plate of similar design, one of these ordinarily being fixed and the other rotative, though they may be rotatable in opposition to each other to produce speedy and effective grinding. Each plate is dished or beveled at 3 in an ordinarly manner to form with the complementary plate a feed intake for the grain delivered from the hopper of the mill. The mill and its conveying means may be those ordinarily used or any adapted for feeding grain, etc., to the plates, both of which in the preferred construction will be similar. At 4 are shown main gathering grinding teeth extending from the rim of the plate to its inner edge. Grinding teeth 5, preferably regularly spaced between the main teeth 4 and of the same general type, extend from the rim in the same general direction as the teeth 4, but are stopped near the beginning of the dished or beveled portion 3 of the plate, this arrangement facilitating the even gathering and distribution of the material to be presented to the grinding portions of the plate. In the preferred construction shown two grinding ribs 6 and 7, approximately parallel with the rim of the plate, spring from each main and secondary gathering tooth 4 and 5, and each of said ribs 6 and 7 extends about half way from its carrying tooth to the next adjacent tooth, each such rib being approximately parallel with the rim of the plate and forming an acute angle with its carrying tooth on its forward-moving side. At 8 are shown deflecting ribs one on each of the main and secondary teeth 4 and 5, said ribs being parallel with and quite close to the rim of the plate.

As in the device of the patent before referred to, the peripheral rib 6 extends from its tooth toward the next adjacent tooth, but does not continue to said tooth, its length being such as to permit the formation of an ejecting passage for ground materials at each space between main and secondary grinding teeth. These peripheral ribs, in the present construction, are preferably of slight surface area, as are the teeth and ribs before described, and each lies at a slightly acute angle to its tooth on the grinding side thereof. It is the shearing action of the main and secondary teeth and their peripheral ribs that completes the grinding of material that has already been subjected to the shearing action of similarly working teeth and ribs nearer the center of the plate.

Connecting the ribs 7 and 8 of each space between grinding teeth is a short tooth or rib 9 approximately perpendicular to said ribs 7 and 8. The faces of the ribs 9 are on the same plane as the ribs 6 and 7 and the deflecting ribs 8 and the grinding teeth 4 and 5, and thus these teeth and ribs form a zigzag unbroken barrier having no openings for the escape of ground material, all of which must find its way toward the point of ejection by passing between the faces of the two plates, which may be more or less close to each other according to the degree of fineness of grinding desired. The employment of the ribs 9 serves to form an additional shearing angle in each tooth space, the result of such additional shearing coupled with the closed zigzag barrier being a considerable increase in the speed of grinding and in the more complete breaking up of the material.

At 11 I have shown bolt-holes for permitting the plate to be fastened to the rotary head of a mill for coöperation with a complementary plate, which will be similar to the first plate, and may be either fixed or rotative.

The manner of operation is as follows: The grain or other material to be ground passes from the hopper through a suitable conveyer and is brought to the intake formed by the dishing or beveling of the two plates, from which it is carried by centrifugal force toward the rim of the plates, passing to the grinding portions of said plates, where it is subjected to a very thorough breaking up, being repeatedly shunted by the deflecting ribs 8 and carried to the points of shearing and into the pockets or shearing angles formed by the teeth and their ribs. These teeth and ribs, when two similar plates are opposed face to face, move upon each other with a continuous shearing action at many points and completely reduce the material quickly to the desired degree of fineness, this depending upon the nearness of the faces of the plates to each other. The deep pockets formed at the cutting angles, such as 10 and 12, serve to hold and replenish the supply of partially ground material, and do not clog, even if the opposing faces contact. With plates of the proper degree of hardness no heating of the material takes place and the grinding action is so thorough that even undried corn may be ground to fine meal under the above conditions, as may also coarse bran, etc., the speed of ejecting in all cases being greater than with the plate of the patent before named or with plates of mills now in general use. Moreover the plates will not heat even when the mill is allowed to run without material fed thereto.

It will be apparent that the desired result is obtained by providing an increase in the number of shearing edges and pockets which are positioned to form a complete barrier to the outward movement of partially ground material. It would seem that this would result in clogging and heating, but it has been found in practice that even with faces slightly contacting the material feeds past the barrier rapidly, does not pack or heat, and is diverted to the last or peripheral series of angular pockets and there receives its last pulverization before being ejected at the openings 13.

It has been found that a plate having a continuous unbroken cutting rim, with no ejecting spaces will heat and become clogged and because of slowness of ejection of material is an impractical device. However with a plate of the present type, one having a zigzag inner barrier cutting ring, the material ground passes the barrier very rapidly, being then subjected to a final pulverization before ejection.

In the case of the present plate, the teeth and ribs may vary in face area and in depth and the number of shearing teeth and ribs may be increased or decreased as desired, so long as the face area of the individual teeth and ribs is comparatively slight and their depth relatively great, and so long as right or acute angled pockets are formed between each pair of grinding teeth to form a Z-shaped cutting connector, the full series of which produce a zigzag retaining barrier encircling the face of the plate.

What I claim is:

1. A grinding plate for feed mills, embodying main grinding teeth converging inwardly from the rim of said plate and whose inner ends are tangent to a line concentric with said rim, a grinding and a deflecting rib on opposite sides of said main teeth and parallel with the rim of the plate, a rib connecting each of said grinding ribs with the deflecting rib of the adjacent tooth, and means for permitting attachment of said plate to a feed mill.

2. A grinding plate for feed mills, embodying main grinding teeth converging inwardly from the rim of said plate and whose inner ends are tangent to a line concentric with said rim, an intermediate shorter grinding tooth between each pair of main teeth, a grinding and a deflecting rib on opposite sides of said main and intermediate teeth and parallel with the rim of the plate, a rib connecting each of said grinding ribs with the deflecting rib of the adjacent tooth, and means for permitting attachment of said plate to a feed mill.

3. A grinding plate for feed mills, embodying main grinding teeth converging inwardly from the rim of said plate and whose inner ends are tangent to a line concentric with said rim, a continuous Z-shaped rib connecting each main tooth with its adjacent tooth, all parts of said rib lying inside the rim of the plate, and means for permitting attachment of said plate to a feed mill.

4. A grinding plate for feed mills, embodying main grinding teeth converging inwardly from the rim of said plate and whose inner ends are tangent to a line concentric with said rim, an intermediate shorter grinding tooth between each pair of main teeth, a continuous Z-shaped rib connecting each main tooth with its adjacent intermediate tooth, all parts of said Z-shaped rib lying inside the rim of the plate, and means for permitting attachment of said plate to a feed mill.

5. A grinding plate for feed mills, embodying main grinding teeth converging inwardly from the rim of said plate and whose inner ends are tangent to a line concentric with said rim, an intermediate shorter grinding tooth between each pair of main teeth, a continuous Z-shaped rib connecting each main tooth with its adjacent intermediate tooth, all parts of said Z-shaped rib lying inside the rim of the plate, a peripheral shearing rib on each of said main and intermediate teeth, a peripheral opening adjacent to each of said peripheral ribs, and means for permitting attachment of said plate to a feed mill.

6. A grinding plate for feed mills, embodying main grinding teeth converging inwardly from the rim of said plate and whose inner ends are tangent to a line concentric with said rim, a continuous Z-shaped rib connecting each main tooth with its adjacent tooth, all parts of said rib lying inside the rim of the plate and all of said teeth and ribs having comparatively slight surface area and relatively great depth, and means for permitting attachment of said plate to a feed mill.

7. A grinding plate for feed mills, embodying main grinding teeth converging inwardly from the rim of said plate and whose inner ends are tangent to a line concentric with said rim, an intermediate shorter grinding tooth between each pair of main teeth, a continuous Z-shaped rib connecting each main tooth with its adjacent intermediate tooth, all parts of said Z-shaped rib lying inside the rim of the plate, a peripheral shearing rib on each of said main and intermediate teeth, all of said teeth and ribs having comparatively slight surface area and relatively great depth, a peripheral opening adjacent to each of said peripheral ribs, and means for permitting attachment of said plate to a feed mill.

Signed at Savona, in the county of Steuben and State of New York, this third day of June, A. D. 1920.

BYRON A. SHAW.

Witnesses:
GEORGE STINSON,
WALTER ANDERSON.